United States Patent Office

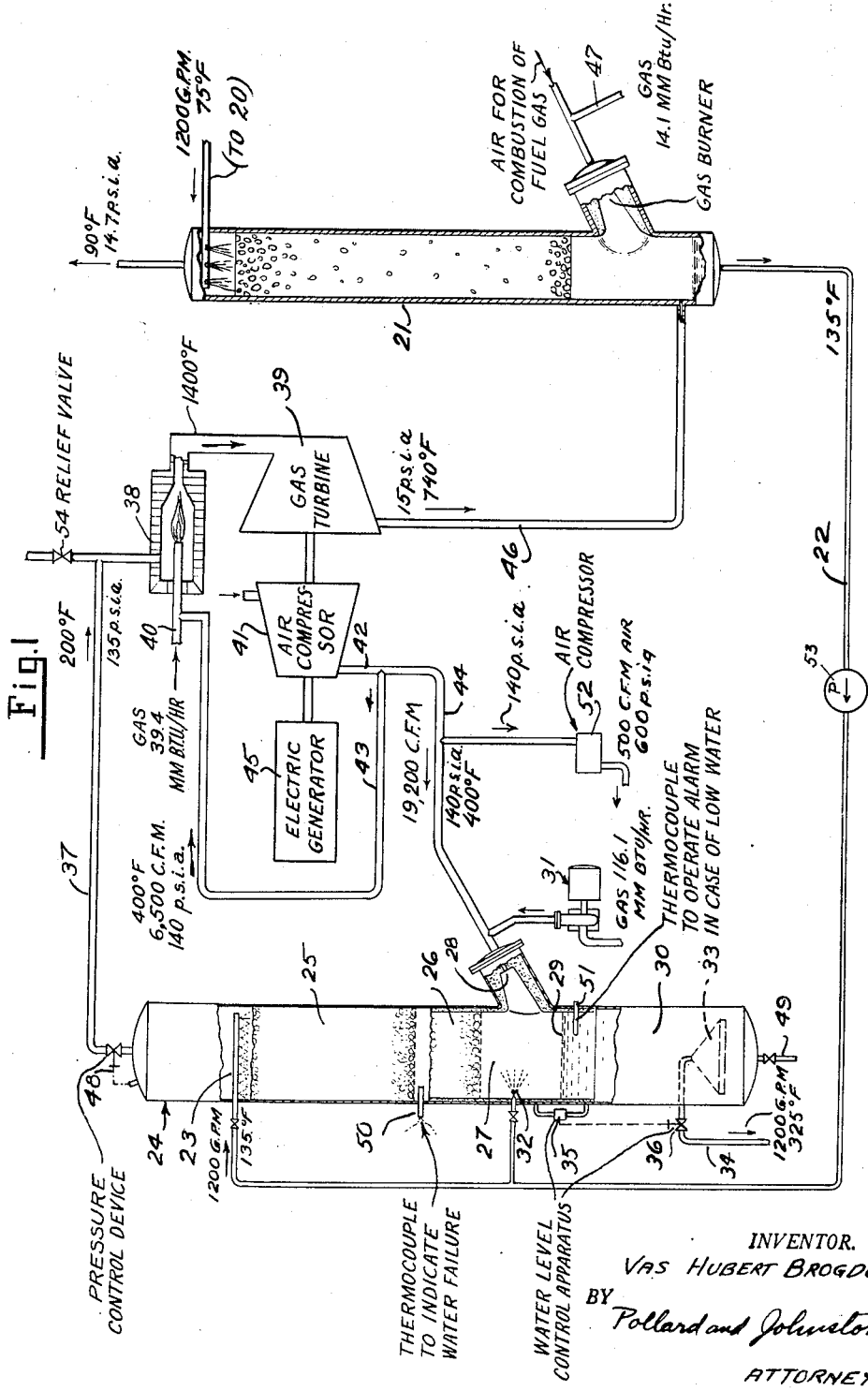

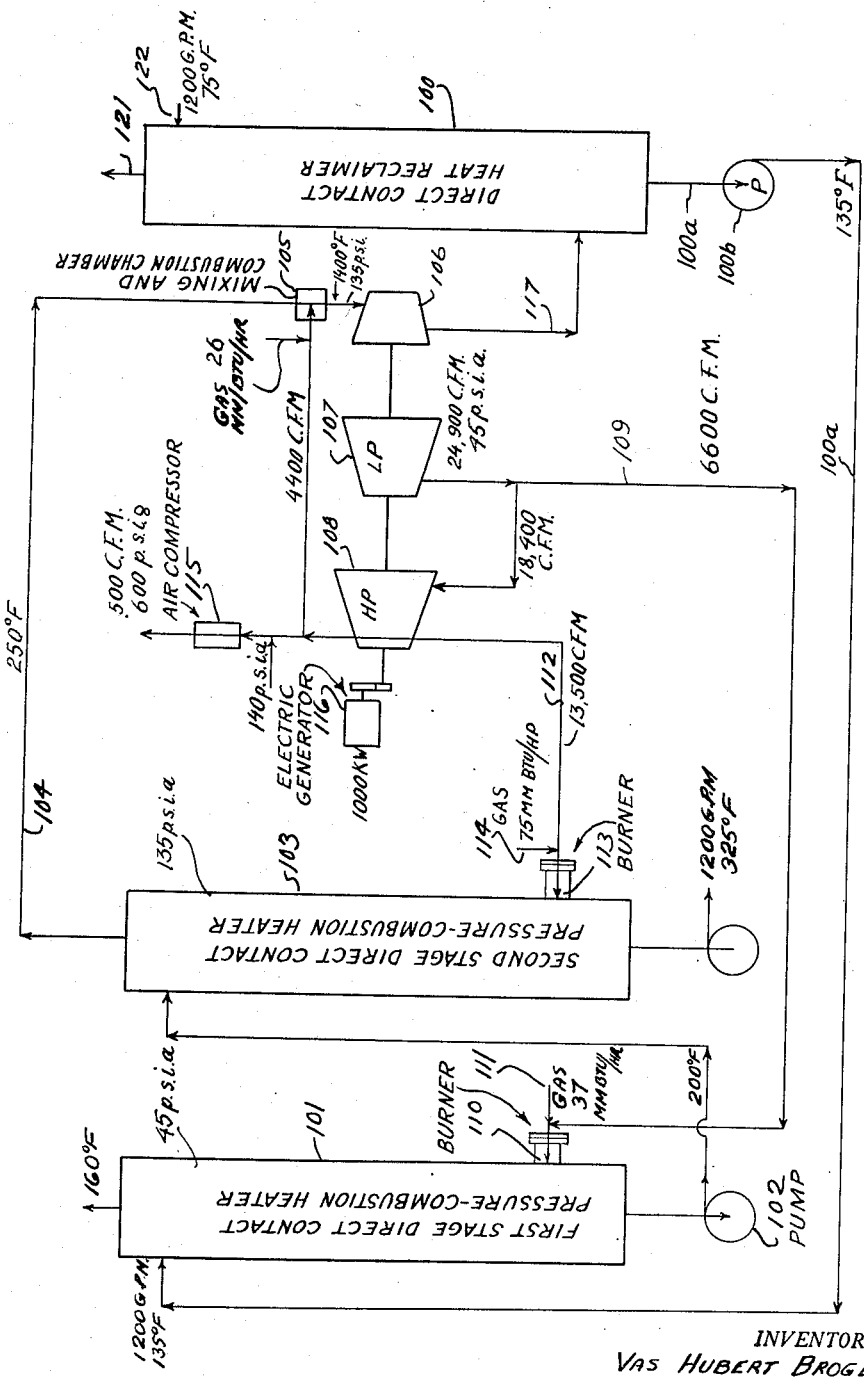

2,781,635
Patented Feb. 19, 1957

2,781,635
PROCESS AND HEATING SYSTEM FOR PROVIDING HOT WATER AND POWER FOR SULFUR MINING

Vas Hubert Brogdon, Port Sulphur, La., assignor to Freeport Sulphur Company, New York, N. Y., a corporation of Delaware Application April 26, 1952, Serial No. 284,673

2 Claims. (Cl. 60—39.05)

This invention relates to a process and apparatus especially useful for heating large quantities of sea water, fresh water, or similar water to temperatures well above 212° F., and is especially concerned with a system using a gas turbine.

Industrial processes frequently require large volumes of hot water in addition to power in the form of electricity. Fresh water suitable for heating in conventional indirect heat exchangers, or in direct contact steam heaters, is often not available, or if available requires costly water treating equipment and involves chemical costs. Equipment required to heat the large volumes of water by conventional means is elaborate, complicated, takes much space and due to its weight requires costly foundations. To operate the conventional plant, several operators are required and/or a large amount of costly automatic instruments must be supplied. Thermal efficiencies of the conventional plant are usually low, and in order to raise these efficiencies costly equipment must be supplied and the operation fixed to narrow limits of output, reducing the flexibility of the operation.

Heated process water in large quantities and power is needed for many purposes. Merely by way of example, large quantities of heated process water are required in the Frasch process of sulphur mining.

One of the main objects of the present invention is to provide a process and apparatus which can be used to heat fresh, sea or similar water to a temperature above that usually causing scale deposition when the water is heated in the conventional indirect heat exchanger.

A further object of the invention is to provide a process and apparatus wherein large quantities of fresh, sea or similar water can be heated to the desired elevated temperature at high efficiency and without the use of indirect heat exchanger surface in contact with the water and without the use of special metals in the heat exchangers.

A still further object of the invention is to provide a simple process and apparatus for heating water and generating power so that combustion air for a direct contact pressure combustion heater can be supplied at no premium in cost, size of equipment, or power output by the use of the gas turbine generator and a modification of the flow of compressed air from the compressor to the combustion chamber of the turbine.

In one embodiment of the invention, fresh, sea or saline water can be supplied under pressure to a direct contact pressure combustion heater, one example of a suitable heater being shown in detail in copending application of Clifford M. Cockrell, Serial No. 280,082, filed April 2, 1952, now Patent No. 2,759,328, issued August 21, 1956. Where the term "water" is used, it includes other liquid where appropriate. The water to be heated in such a direct contact pressure combustion heater passes through a heat transfer zone or zones to the combustion chamber and is collected in the hot liquid reservoir at the bottom thereof, the water being heated by direct contact with the combustion gases and vapor. The heater may have fuel and combustion air supplied under pressure. There may be two steps involved in the heating of the water. One step can take place just above or adjacent the combustion chamber where water is transformed to vapor. The second step can take place thereafter at which time the vapor gives up its latent heat to the incoming water. The heated process water can be withdrawn from the bottom of the pressure combustion heater.

The gas from the top or gas exit portion of the tower is fed to the combustion chamber inlet of a gas turbine with a negligible loss in pressure. A gas turbine and the direct contact pressure combustion heater of the invention both require large quantities of air. The gas turbine has an axial flow compressor connected to its shaft, part of the air from the compressor being fed to the pressure combustion heater, and the remainder of the air being fed to the gas turbine. Fuel can be added at the inlet of the gas turbine for operation thereof.

In a further aspect, exhaust gases from the turbine can be passed through a suitable heat reclaimer to preheat the raw water before it is fed to the pressure combustion heater. The gas turbine also may have a connected electric generator for supplying power to the various pumps or auxiliaries of the system.

The pressure in the pressure combustion heater can be chosen so as to be sufficiently high to maintain a partial pressure of vapor equivalent to the temperature of process liquid desired. If water is heated at atmospheric pressure in a direct contact heater, it is impossible to heat the same to more than about 190° F., even when natural gas under ideal conditions and theoretical temperatures is considered. This is due to the fact that the heat in the fuel burned is utilized in vaporizing water, this water vapor produced being a maximum of about 70 percent by volume when mixed with the combustion gases resulting in a water vapor partial pressure of about 10.6 pounds absolute, or a maximum vapor temperature of 196° F. with the tower operating at atmospheric pressure. When heating is accomplished in a pressure combustion heater of the type described herein, the increased pressure increases the partial pressure of the water vapor, consequently increasing the temperature of the water.

The system is especially adapted for the use of automatic controls for controlling temperature, pressure, water level, etc. so that from the operating viewpoint it is particularly advantageous.

These and other objects, features, and advantages of the invention will become apparent from the following descriptions and drawings which are to be considered merely exemplary.

In the drawings:

Fig. 1 is a schematic illustration of one form of the system.

Fig. 2 is a schematic illustration of a further form of the invention.

For purposes of illustration, the invention will be described in conjunction with a process water requirement of 1200 gallons per minute with the water at 325° F. for use in connection with Frasch process sulphur mining. The pressure in the heater is about 135 pounds per square inch absolute (p. s. i. a.). It is to be understood, however, that the invention can be used for other purposes and that other quantities and temperatures can be supplied by using its principles.

In a first form of the invention, the raw water can be supplied by pump 20 (Fig. 1) to a conventional direct contact heat reclaimer 21, the heat being furnished thereto in a manner which will be described hereafter. Preheated raw water is fed through line 22 by pump 53 to the water distributing means 23 of the direct contact pressure combustion heater indicated generally at 24.

As previously mentioned, details of the direct contact pressure combustion heater can be found in copending application Serial No. 280,082. The water passes down through the upper heating zone 25 having suitable packing therein. The water then enters a lower heating zone 26 having relatively open gas passages therein. Combustion chamber 27 has a burner means 28 arranged so that the flame will be directed toward the lever 29 of the water in hot water reservoir 30. Fuel pump 31 furnishes fuel under suitable pressure to burner 28. The air supply for combustion will be described hereafter. The packing may be arranged as shown or may be continuous.

A water spray nozzle 32 may be employed so as to direct a spray of water into the combustion chamber 27, such a spray reducing the gas temperature in the combustion chamber rapidly and converting some of the water into vapor passing upwardly with the combustion gas. There also will be transfer of heat by radiant energy in the combustion zone or chamber. As the vapor passes upwardly and contacts the water passing downwardly in the upper zone, the water vapor will condense and give off its latent heat. Thus, it can be said that there are two steps in the heat transfer.

Clarification cone 33 may be located at the bottom of the water reservoir, process water being drawn upwardly therethrough to the process feed line 34. Conventional water level control apparatus 35 can be used to control valve 36 regulating the passage of water out of the heater so as to maintain the desired level 29.

Flue gas is fed through line 37 to the mixing and combustion chamber 38 for gas turbine 39. Mixing and combustion chamber 38 or similar arrangement can have fuel line 40 for supplying fuel to gas turbine 39. Gas turbine 39 can be of conventional construction according to its operating pressure and temperature, axial flow compressor 41 being connected to the gas turbine 39 in the usual manner.

Air from the outlet pipe 42 of the axial flow compressor is fed through line 43 to the mixing and combustion chamber 38 for the required combustion air to heat the mixture of gases to the desired temperature. The other portion of the air from the axial flow compressor 41 is fed through line 44 at the desired pressure to burner 28.

A conventional electric generator 45 can be connected in conventional manner to the axial flow compressor shaft, power being taken from said generator for supplying various auxiliaries of the system and for other uses.

The exhaust from the gas turbine 39 can be fed through line 46 to the heat reclaimer 21 for the purpose of adding heat to the raw water being fed into the heat reclaimer. The heat reclaimer 21 also may have an auxiliary supply of heat furnished by means of fuel burned therein through line 47. The pressure in the direct contact pressure heater can be controlled by the pressure control valve 48 in the top thereof. Regulation of the gas turbine may be accomplished by conventional means, or if the power load is less than the maximum that can be generated utilizing all of the flue gases in line 37, a relief valve 54 may discharge the excess. Thermocouple 50 can be inserted in the heater for the purpose of operating a water failure arrangement. A thermocouple 51 also can be employed for a low water alarm. Sludge blow-off line 49 can be inserted in the bottom of the heater for removing foreign matter.

Merely by way of example, heat balance figures have been indicated on Figure 1 of the drawings for a system furnishing 1200 gallons per minute (G. P. M.) of water at 325° F. for use in conjunction with a Frasch sulphur mining process, the pressure combustion heater being operated at 135 p. s. i. a. Air compressor 52 is for the purpose of furnishing air for use in conjunction with the sulphur mining process, or for other processes.

In a further aspect of the invention, the water can be heated in a two stage direct contact pressure combustion heater arrangement, such being illustrated in Figure 2. Raw water is fed to heat reclaimer 100 by duct 122 from which it is withdrawn and supplied through conduit 100a and pump 100b to the first direct contact pressure combustion heater 101, the direct pressure combustion heater being generally similar to the one described in conjunction with Figure 1. The heated water from the first stage direct contact pressure heater is fed by pump 102 to the second direct contact heater 103. Flue gas from the high pressure direct contact combustion heater 103 is supplied through line 104 to the mixing and combustion chamber 105 for the gas turbine 106. Gas turbine 106 drives low pressure and high pressure axial flow compressors 107 and 108, these being conventional in character. Air from the low pressure compressor 107 is fed through line 109 to the burner 110 of the first stage direct contact combustion heater. Gas fuel is fed to burner 110 through line 111. Air from the high pressure compressor is fed through line 112 to the burner 113 of the second stage direct contact pressure combustion heater 103. Fuel is supplied through line 114 to the burner of heater 103. Air for the sulphur mining process can be withdrawn, if desired, to compressor 115 as described for Figure 1. A generator 116 can be connected to the gas turbine.

The exhaust line 117 from the turbine is connected to heat reclaimer 100, the gas finally being exhausted to the atmosphere at 121 from the heat reclaimer 100.

Merely by way of example for the form seen in Figure 2, heat balance figures are shown for supplying water at 1200 gallons per minute and at 325° F. similar to Figure 1. The particular cycle chosen will depend upon the efficiency desired and the cost involved. The system inherently is high in efficiency.

Various arrangements can be used and details of construction changed without departing from the spirit of the invention except as defined in the appended claims.

What is claimed is:

1. A process of providing large quantities of hot process water and power needed in sulfur mining, in a system including a packed heating tower, a gas turbine and an air compressor operated by said turbine which comprises, maintaining a reservoir of water in a bottom portion of said tower, burning fuel under pressure in a zone below the packing in said tower but above and adjacent the surface of the water in said reservoir, directing the flame of the burning fuel downwardly toward the surface of the water in said reservoir whereby radiant heat of the flame is taken up by said water, thereby forming combustion gases under pressure in said zone, feeding scale-forming water under pressure into direct contact with the resulting combustion gases arising in said tower so as to heat said water to temperatures required in sulfur mining while flowing downwardly over said packing and through said zone, maintaining said zone at a pressure related to the temperature to which the water is to be heated, withdrawing the heated water from said reservoir, for use in sulfur mining, withdrawing cooled combustion gases from the tower after they have given up heat to the water in said tower, feeding at least a part of said gas from said air compressor to said zone, burning fuel with air from said compressor in a separate combustion zone, cooling the resulting hot combustion gases by mixing therewith the said cooled combustion gases, feeding the resulting cooled gas mixture to said turbine, and preheating the scale-forming water being fed to said tower by direct contact with the exhaust gases from said turbine.

2. In a system for heating scale-forming raw water or the like in large quantities and for producing power needed in sulfur mining, the combination including a pressure-heating packed tower, a combustion zone at a lower level in said tower, a burner leading thereto, means feeding fuel and air to said burner, means maintaining said tower under pressure related to the temperature to which said water is to be heated, means feeding water to be heated into said tower at an upper level therein and (1) into direct contact with combustion gases rising from said combustion zone (2) into said combustion gases, and (3) into a collecting zone constituting a reservoir for water the surface of which forms the boundary of the combustion zone, said burner means being mounted in the side of said tower and directed downwardly toward said water surface such that radiant heat thereof is taken up by the water, means withdrawing heated water from said reservoir and system, gas turbine means of a power rating capable of operating an air compressor of a capacity sufficient to provide the air required for the herein specified combustion purposes and for the mining of sulfur, air compressor means of said capacity driven by said turbine, means feeding air from said compressor to said combustion chamber, other means burning fuel with air from said compressor, means mixing the resulting product with spent combustion gases from said vessel after they have been contacted by said water, means feeding said spent combustion gases from said vessel to said mixing means, means feeding the mixture of gases to said gas turbine, heat reclaimer means connected with the turbine exhaust, means feeding water through said heat reclaimer and then to said pressure tower, and means withdrawing air from said compressor for use in sulfur mining.

References Cited in the file of this patent

UNITED STATES PATENTS

| | | |
|---|---|---|
| 864,821 | Zoelly | Sept. 3, 1907 |
| 996,324 | de Ferranti | June 27, 1911 |
| 1,230,417 | Lillie | June 19, 1917 |
| 1,988,456 | Lysholm | Jan. 22, 1935 |
| 2,186,706 | Martinka | Jan. 9, 1940 |
| 2,596,968 | Harris | May 20, 1952 |
| 2,647,370 | Miller | Aug. 4, 1953 |